US008590286B2

(12) United States Patent
Roberge et al.

(10) Patent No.: US 8,590,286 B2

(45) **Date of Patent: *Nov. 26, 2013**

(54) GAS TURBINE ENGINE SYSTEMS INVOLVING TIP FANS

(75) Inventors: Gary D. Roberge, Tolland, CT (US); Gabriel L. Suciu, Glastonbury, CT (US)

(73) Assignee: United Technologies Corp., Hartford, CT (US)

(*) Notice: Subject to any disclaimer, the term of this patent is extended or adjusted under 35 U.S.C. 154(b) by 1023 days.

This patent is subject to a terminal disclaimer.

(21) Appl. No.: 11/950,614

(22) Filed: Dec. 5, 2007

(65) Prior Publication Data

US 2009/0145102 A1 Jun. 11, 2009

(51) Int. Cl.

| | |
|---|---|
| *F02K 3/065* | (2006.01) |
| *F02K 3/072* | (2006.01) |
| *F02K 3/075* | (2006.01) |
| *F02K 3/077* | (2006.01) |

(52) U.S. Cl.

USPC ......... 60/226.1; 60/226.3; 60/268; 60/39.162

(58) Field of Classification Search

USPC ................. 60/226.1, 262, 268, 39.162, 226.3

See application file for complete search history.

(56) References Cited

U.S. PATENT DOCUMENTS

| | | | | |
|---|---|---|---|---|
| 3,549,272 | A | 12/1970 | Bauger et al. | |
| 3,673,802 | A * | 7/1972 | Krebs et al. | 60/226.1 |
| 3,729,957 | A * | 5/1973 | Petrie et al. | 60/226.1 |
| 3,861,139 | A * | 1/1975 | Jones | 60/226.1 |
| 3,879,941 | A * | 4/1975 | Sargisson | 60/226.3 |
| 4,005,575 | A | 2/1977 | Scott et al. | |
| 4,021,142 | A | 5/1977 | Violette | |
| 4,043,121 | A | 8/1977 | Thomas et al. | |
| 4,080,785 | A * | 3/1978 | Koff et al. | 60/226.3 |
| 4,124,330 | A | 11/1978 | Barnes | |
| 4,251,987 | A | 2/1981 | Adamson | |
| 4,751,816 | A * | 6/1988 | Perry | 60/226.1 |
| 4,790,133 | A * | 12/1988 | Stuart | 60/226.1 |
| 4,791,783 | A * | 12/1988 | Neitzel | 60/262 |
| 4,860,537 | A * | 8/1989 | Taylor | 60/226.1 |
| 4,964,844 | A | 10/1990 | Bagnall | |
| 4,976,102 | A * | 12/1990 | Taylor | 60/226.1 |
| 5,010,729 | A * | 4/1991 | Adamson et al. | 60/226.1 |
| 5,182,905 | A | 2/1993 | Stransky et al. | |
| 5,201,801 | A * | 4/1993 | Smith, Jr. | 60/226.1 |
| 5,305,616 | A * | 4/1994 | Coffinberry | 62/402 |
| 5,315,821 | A * | 5/1994 | Dunbar et al. | 60/226.1 |
| 5,392,614 | A * | 2/1995 | Coffinberry | 62/402 |
| 5,402,638 | A * | 4/1995 | Johnson | 60/204 |
| 5,404,713 | A | 4/1995 | Johnson | |
| 5,809,772 | A * | 9/1998 | Giffin et al. | 60/226.1 |
| 6,209,311 | B1 * | 4/2001 | Itoh et al. | 60/226.3 |
| 6,339,927 | B1 | 1/2002 | DiPietro, Jr. | |
| 6,381,948 | B1 * | 5/2002 | Klingels | 60/226.1 |
| 6,471,482 | B2 | 10/2002 | Montgomery et al. | |
| 6,666,017 | B2 * | 12/2003 | Prentice et al. | 60/226.1 |
| 6,732,502 | B2 * | 5/2004 | Seda et al. | 60/226.1 |

(Continued)

*Primary Examiner* — Ted Kim
*Assistant Examiner* — Michael B Mantyla

(57) ABSTRACT

Gas turbine engine systems involving tip fans are provided. In this regard, a representative gas turbine engine system includes: a multi-stage fan having a first rotatable set of blades and a second counter-rotatable set of blades, the first rotatable set of blades defining an inner fan and a tip fan; and an epicyclic differential gear assembly operative to receive a torque input and differentially apply the torque input to the first set of blades and the second set of blades.

16 Claims, 2 Drawing Sheets

(56) References Cited

U.S. PATENT DOCUMENTS

| | | | | |
|---|---|---|---|---|
| 6,739,120 | B2 * | 5/2004 | Moniz et al. | 60/226.1 |
| 6,763,652 | B2 * | 7/2004 | Baughman et al. | 60/39.162 |
| 6,901,739 | B2 | 6/2005 | Christopherson | |
| 7,185,484 | B2 | 3/2007 | Griffin, III et al. | |
| 7,216,475 | B2 * | 5/2007 | Johnson | 60/226.1 |
| 7,246,484 | B2 * | 7/2007 | Giffin et al. | 60/268 |
| 7,526,913 | B2 * | 5/2009 | Orlando et al. | 60/268 |
| 7,614,210 | B2 * | 11/2009 | Powell et al. | 60/226.3 |
| 7,726,113 | B2 * | 6/2010 | Orlando et al. | 60/39.162 |
| 7,752,836 | B2 * | 7/2010 | Orlando et al. | 60/268 |
| 7,788,898 | B2 * | 9/2010 | Kern et al. | 60/204 |
| 7,841,165 | B2 * | 11/2010 | Orlando et al. | 60/204 |
| 2003/0163984 | A1 | 9/2003 | Seda et al. | |
| 2003/0217546 | A1 | 11/2003 | Prentice et al. | |
| 2004/0055275 | A1 | 3/2004 | Robert Joseph et al. | |
| 2004/0060279 | A1 | 4/2004 | Robert Joseph et al. | |
| 2005/0047942 | A1 * | 3/2005 | Grffin et al. | 417/423.1 |
| 2005/0081509 | A1 | 4/2005 | Johnson | |
| 2006/0090450 | A1 | 5/2006 | Moniz et al. | |
| 2006/0102777 | A1 | 5/2006 | Rock | |
| 2007/0084186 | A1 * | 4/2007 | Orlando et al. | 60/204 |
| 2007/0186535 | A1 * | 8/2007 | Powell et al. | 60/226.1 |
| 2008/0120839 | A1 * | 5/2008 | Schilling | 29/888.02 |
| 2009/0000271 | A1 * | 1/2009 | Kupratis | 60/224 |
| 2009/0090096 | A1 | 4/2009 | Sheridan | |
| 2010/0180572 | A1 | 7/2010 | Wadia et al. | |
| 2013/0028712 | A1 * | 1/2013 | Roberge et al. | 415/122.1 |

* cited by examiner

GAS TURBINE ENGINE SYSTEMS INVOLVING TIP FANS

BACKGROUND

1. Technical Field

The disclosure generally relates to gas turbine engines.

2. Description of the Related Art

Gas turbine engines, particularly those for military use, typically are designed to accommodate either the desire for aircraft speed (e.g., supersonic capability) or on-station time (i.e., loiter capability). In this regard, turbojet engines are commonly used to accommodate high aircraft speed, whereas turbofan and turboprop engines are commonly used to accommodate increased range or high on-station time.

SUMMARY

Gas turbine engine systems involving tip fans are provided. In this regard, an exemplary embodiment of a gas turbine engine system comprises: a multi-stage fan having a first rotatable set of blades and a second counter-rotatable set of blades, the first rotatable set of blades defining an inner fan and a tip fan; and an epicyclic differential gear assembly operative to receive a torque input and differentially apply the torque input to the first set of blades and the second set of blades.

An exemplary embodiment of a gas turbine engine system comprises: a tip fan having a first rotatable set of blades; a second rotatable set of blades located downstream of the first set of blades; and a differential gear assembly operative to receive a torque input and differentially apply the torque input to the first set of blades and the second set of blades.

An exemplary embodiment of a gas turbine engine comprises: a first annular gas flow path; a second annular gas flow path located radially outboard of the first gas flow path; a third annular gas flow path located radially outboard of the second gas flow path; a first rotatable set of blades operative to interact with gas moving along the first gas flow path, the second gas flow path and the third gas flow path; a second rotatable set of blades located downstream of the first set of blades and operative to interact with gas moving along the first gas flow path and the second gas flow path; and a differential gear assembly operative to receive a torque input and differentially apply the torque input to the first set of blades and the second set of blades.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving tip fans are provided, several exemplary embodiments of which will be described in detail. In this regard, some embodiments of a gas turbine engine system incorporate the use of a fan that can adapt to a variety of operating conditions, such as supersonic and subsonic loiter conditions. In some embodiments, the fan is a multi-stage fan that incorporates a tip fan and is driven by a differential gear assembly. Notably, the differential gear assembly enables stages of the multi-stage fan to exhibit different rotational speeds.

Figure 1:
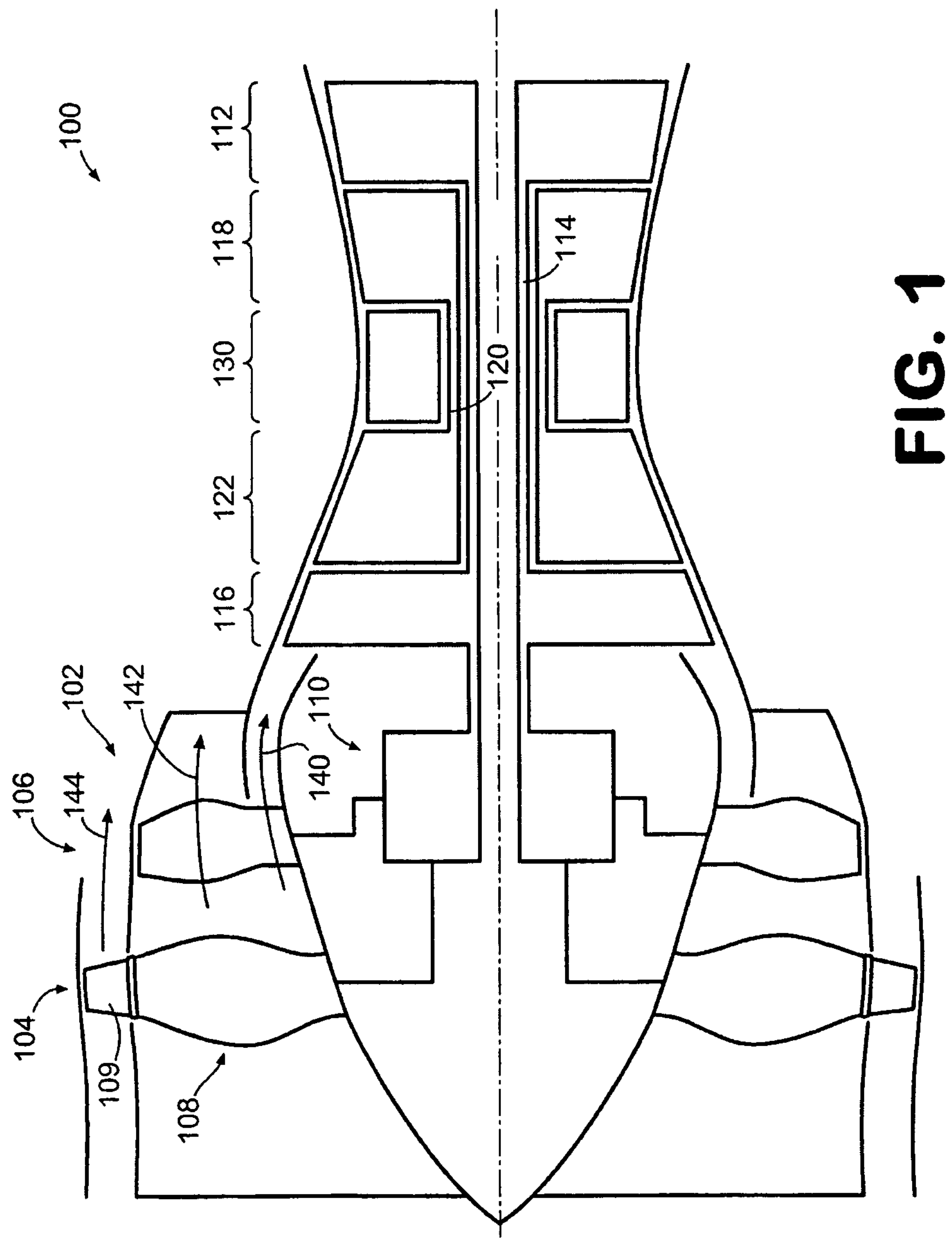
FIG. 1 is a schematic diagram depicting an exemplary embodiment of a gas turbine engine.

In this regard, reference is made to FIG. 1, which schematically depicts an exemplary embodiment of a gas turbine engine system. As shown in FIG. 1, system 100 incorporates a multi-stage fan 102 that includes a forward fan stage 104 and a rear fan stage 106. Notably, the forward fan stage incorporates an inner fan 108 and a tip fan 109. Specifically, each of the blades of the forward fan stage includes distal end portions that form the tip fan. Each of the fan stages includes a corresponding set of rotatable blades, with each of the sets of blades being powered by a differential gear assembly 110.

Differential gear assembly 110 is coupled to a low-pressure turbine 112 via shaft 114. In addition to providing torque for rotating the multi-stage fan, low-pressure turbine 112 powers a low-pressure compressor 116. Low-pressure turbine 112 is located downstream of a high-pressure turbine 118 that is connected through shaft 120 to a high-pressure compressor 122. A combustor 130 is located downstream of the high-pressure compressor and upstream of the high-pressure turbine.

Low-pressure compressor 116, high-pressure compressor 122, combustor 130, high-pressure turbine 118 and low-pressure turbine 112 are located along an annular gas flow path 140. Gas flow path 140 also receives a flow of gas from multi-stage fan 102. However, gas from multi-stage fan 102 also is directed along an annular gas flow path 142 (e.g. a primary bypass stream), which is located radially outboard of gas flow path 140, and along an annular gas flow path 144 (e.g., a secondary bypass stream), which is located radially outboard of gas flow path 142. Specifically, tip fan 109 is positioned along gas flow path 144.

In operation, the differential gear assembly enables rotational speeds of the fan stages of the multi-stage fan to accommodate various operational requirements. By way of example, for high-speed flight operations, the forward fan stage can be set to a relatively high rotational speed while the rotational speed of the rear fan stage is set to a lower rotational speed. Notably, achieving a desired rotational speed can be accomplished by altering the pitch and/or camber of the blades of one or more of the fan stages. For instance, by increasing the pitch and/or camber of the blades of the forward fan stage, fan stage work and fan pressure ratio of the forward fan stage is increased, which causes a corresponding decrease in rotational speed of the forward fan stage. Responsive to this speed decrease, the differential gear assembly causes the rotational speed of the rear fan stage to increase.

With respect to low-speed operations, the forward fan stage can be controlled via pitch and/or camber change to exhibit a higher fan pressure ratio and corresponding reduced rotational speed, whereas the rear fan stage can exhibit a lower fan pressure ratio and a corresponding higher rotational speed. In transitioning to high-speed operations, the pitch and/or camber of the blades of the forward fan stage can be decreased, which causes a corresponding increase in rotational speed of the forward fan stage and an increase in rotational speed of the rear fan stage.

Additionally or alternatively, the tip fan 109 can be used to influence high-speed and low-speed operations. In addition, the flow characteristics of the secondary bypass stream 144 can be used separately, or in concert with the primary bypass stream 142 to affect exhaust system cooling and/or engine or vehicle thermal management. In this regard, high rotational speed typically is exhibited by the forward fan stage during high-speed operations. In this mode of operation, airflow to the tip fan can be restricted. As such, the tip fan is not able to perform a high degree of work and, therefore, the tip fan does not significantly reduce the rotational speed of the forward fan stage. In contrast, for low-speed operations in which slower rotational speed of the forward fan stage typically is exhibited, airflow to the tip fan can be increased. This tends to slow the forward fan stage and reduces the pressure ratio across the forward fan stage.

It should be noted that the embodiment of FIG. 1 includes two fan stages that are configured to exhibit different rotational speeds. In other embodiments, various other numbers of stages can be used. In some of these embodiments, two or more of the stages can be controlled to exhibit the same rotational speed.

Figure 2:
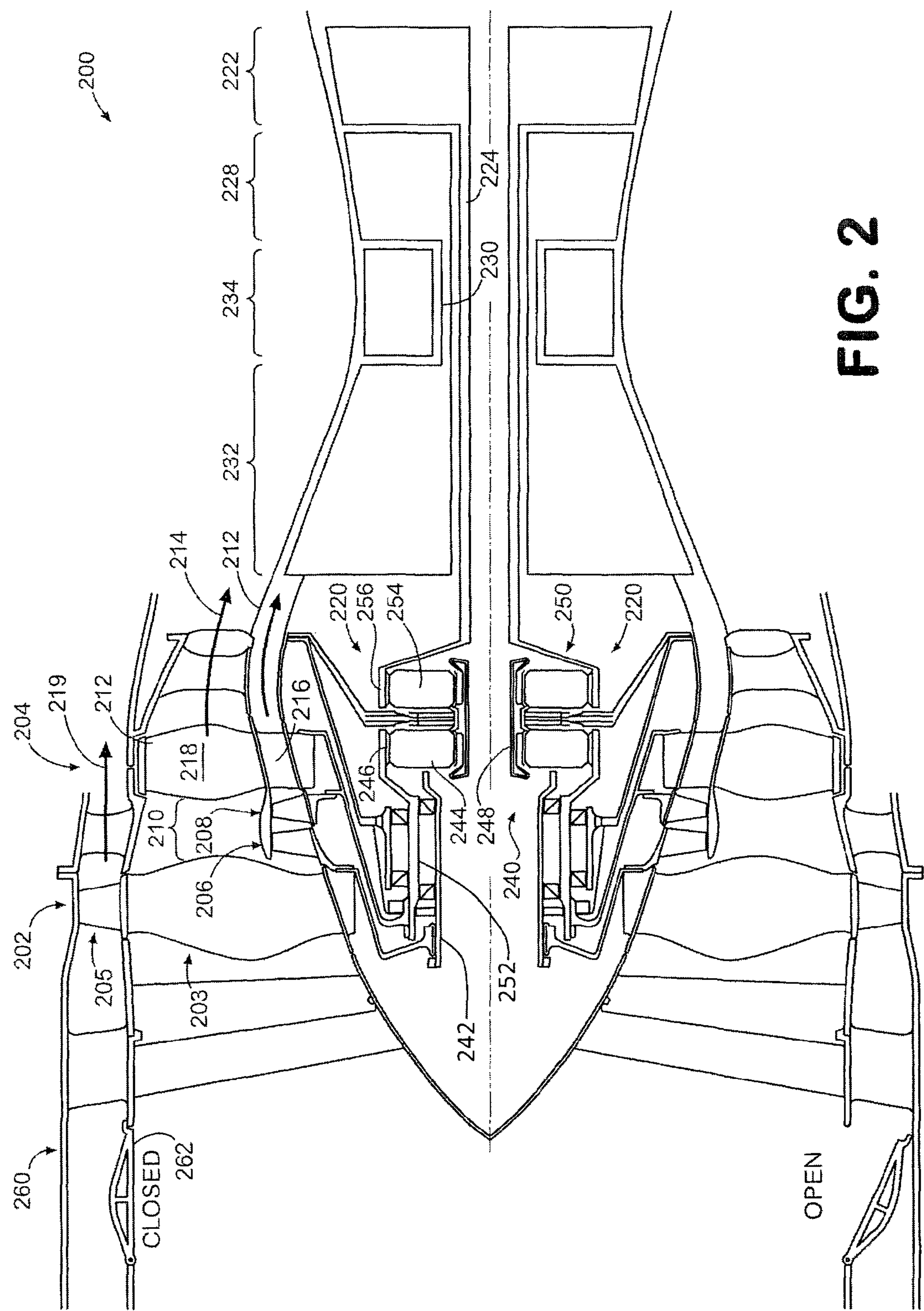
FIG. 2 is a schematic diagram depicting another exemplary embodiment of a gas turbine engine.

FIG. 2 is a schematic diagram depicting another embodiment of a gas turbine engine system. As shown in FIG. 2, system 200 includes a multi-stage fan that incorporates a forward fan stage 202 and a rear fan stage 204. Notably, the forward fan stage incorporates an inner fan 203 and a tip fan 205. Each of the fan stages includes a corresponding set of rotatable blades, with first and second sets of blades (206, 208) of a low-pressure compressor 210 being located between the fan stages.

Each of the blades of the forward fan stage includes distal end portions that form the tip fan. Each of the blades of the rear fan stage includes an inner portion, which is located along an annular inner gas flow path 212, and an outer portion, which is located along an annular outer gas flow path 214 (located radially outboard of gas flow path 212). For instance, blade 212 includes an inner portion 216 located along gas flow path 212 and an outer portion 218 located along gas flow path 214. The first and second sets of blades (206, 208) of the low-pressure compressor are located along inner gas flow path 212, whereas the tip fan is located along an annular gas flow path 219 (located radially outboard of gas flow path 214).

Each of the sets of blades of the multi-stage fan and of the low-pressure compressor is powered by an epicyclic differential gear assembly 220. The differential gear assembly is coupled to a low-pressure turbine 222 via shaft 224. Low-pressure turbine 222 is located downstream of a high-pressure turbine 228 that is connected through shaft 230 to a high-pressure compressor 232. A combustor 234 is located downstream of the high-pressure compressor and upstream of the high-pressure turbine.

In the embodiment of FIG. 2, differential gear assembly 220 incorporates a forward epicyclic gear 240 and a rear epicyclic gear 250. The forward epicyclic gear includes a carrier 242, planet gears (e.g., planet gear 244) held by the carrier, a ring gear 246 surrounding the planet gears, and a sun gear 248 about which the planet gears rotate. The rear epicyclic gear includes a carrier 252, planet gears (e.g., planet gear 254) held by the carrier and a ring gear 256 surrounding the planet gears. Notably, the rear epicyclic gear and the forward epicyclic gear share sun gear 248.

In operation, the first and second sets of blades (206, 208) of the low-pressure compressor rotate with corresponding sets of blades of the fan stages. Specifically, the forward fan stage 202 (i.e., the inner fan and the tip fan) and first set of compressor blades 206 rotate with carrier 242 of the forward epicyclic gear. In contrast, the rear fan stage 204 and second set of compressor blades 208 rotate with ring gear 246 of the forward epicyclic gear. Note that the fan stages, and thus the first and second set of compressor blades, are counter-rotating.

In operation, the differential gear assembly enables rotational speeds of the multi-stage fan and the low-pressure compressor to accommodate various operational requirements. By way of example, for high-speed flight operations, the forward fan stage and first set of compressor blades can be set to a relatively high rotational speeds, while the rotational speeds of the rear fan stage and second set of compressor blades can be lower.

Achieving a desired rotational speed can be accomplished by altering the flow of air to the tip fan. For instance, by increasing the flow of air to the tip fan, fan pressure ratio of the first stage fan is increased, which causes a corresponding decrease in rotational speeds of the first stage fan and the first set of compressor blades. Responsive to this speed decrease, the differential gear assembly causes the rotational speeds of the rear stage fan and the second set of compressor blades to increase.

With respect to low-speed operations, the forward fan stage can be controlled to exhibit a higher fan pressure ratio, which results in corresponding reduced rotational speeds of the forward fan stage and the first set of compressor blades. Responsive to these reduced speeds, the rear fan stage can exhibit a higher rotational speed (which also is exhibited by the second set of compressor blades) and a corresponding lower fan pressure ratio. Notably, the counter-rotating configuration embodied provides high relative velocities between adjacent low pressure compressor blades resulting in relatively high levels of pressure ratio. This counter-rotating arrangement allows for a preservation of core supercharging and thermodynamic efficiency as fan speeds are modulated through the epicyclic differential gearbox.

In transitioning to high-speed operations, the flow of air to the tip fan can be decreased, which causes a corresponding increase in rotational speeds of the first stage fan and the first set of compressor blades. This can be accomplished by selectively closing one or more valves (e.g., valve 262) of an inlet valve assembly 260. In this embodiment, the inlet valve assembly includes an annular arrangement of valves that can be controlled to alter airflow to the tip fan. It should be noted that, in transitioning to slower speeds, spillage drag oftentimes is experienced by gas turbine engines as the need for intake air required by the engine for reduced thrust reduces quicker, and to a level ultimately lower, than the aircraft inlet's ability to deliver flow to the engine. During such a transition, inlet valve assembly 260 can be adjusted to an open position. In the open position, excess air, which could otherwise cause spillage drag, could be diverted from gas flow path 219 to gas flow path 214.

With respect to low-speed operations, one or more valves of inlet valve assembly 260 can be maintained in the open position. As such, an increased flow of air is provided to the tip fan, which causes the work of the forward fan stage to increase. Responsive to the increase in work, rotational speed of the forward fan stage slows, which causes a corresponding increase in the rotational speed of the rear fan stage as described above.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine having an axis comprising:

an annular first gas flow path;

an annular second gas flow path located radially outboard of the first gas flow path;

an annular third gas flow path located radially outboard of the second gas flow path;

a first rotatable set of blades extending radially from the axis and operative to interact with gas moving along the first gas flow path and the second gas flow path;

a second rotatable set of blades extending radially from the axis and located upstream of the first set of blades and operative to interact with gas moving along the first gas flow path, the second gas flow path and the third gas flow path;

a differential gear assembly having a plurality of outputs operative to receive a torque input from an engine shaft and differentially apply the outputs from the torque input to the first set of blades and the second set of blades;

the differential gear assembly having a first epicyclic gear and a second epicyclic gear which are axially spaced from one another and driven by a single sun gear; and wherein the first annular gas flow path, the second annular gas flow path, and the third annular gas flow path are partitioned from one another at a location upstream of the first rotatable set of blades.

2. The engine of claim 1, wherein:

the engine further comprises a low pressure turbine; and the shaft is operative to be driven by the low pressure turbine.

3. The engine of claim 1, wherein the first set of blades is operative to counter-rotate relative to the second set of blades.

4. The engine of claim 1, further comprising an inner fan, the first set of blades of the tip fan extending outwardly from the inner fan.

5. A gas turbine engine comprising:

a first annular gas flow path;

a second annular gas flow path located radially outboard of the first gas flow path;

a third annular gas flow path located radially outboard of the second gas flow path;

a first rotatable set of blades operative to interact with gas moving along the first gas flow path, the second gas flow path and the third gas flow path;

a second rotatable set of blades located downstream of the first set of blades with respect to gas flow through the engine, and operative to interact with gas moving along the first gas flow path and the second gas flow path; and a differential gear assembly operative to receive a torque input and differentially apply the torque input to the first set of blades and the second set of blades;

the differential gear assembly and a second epicyclic gear which are axially spaced from one another and driven by a single sun gear; and wherein the first annular as flow path, the second annular gas flow path, and the third annular gas flow path are partitioned from one another at a location upstream of the second rotatable set of blades.

6. The engine of claim 5, further comprising an inlet valve assembly located upstream of the first set of blades, the inlet valve assembly being operative to selectively divert gas to the third gas flow path.

7. The engine of claim 5, wherein the first set of blades is operative to counter-rotate relative to the second set of blades.

8. The engine of claim 5, further comprising a third rotatable set of blades located between the first set of blades and the second set of blades and operative to interact with gas moving along only the first gas flow path.

9. The engine of claim 8, wherein third set of blades is operative to counter-rotate with respect to the second set of blades.

10. The engine of claim 8, further comprising a fourth rotatable set of blades located between the third set of blades and the second set of blades and operative to interact with gas moving along only the first gas flow path.

11. The engine of claim 10, wherein fourth set of blades is operative to counter-rotate with respect to the first set of blades.

12. The engine of claim 5, wherein the first set of blades form an inner fan and a tip fan, the inner fan being operative to interact with gas moving along the first gas flow path and the second gas flow path, the tip fan being operative to interact with gas moving along the third gas flow path.

13. The engine of claim 5, further comprising a rotatable splitter operative to rotate with the second set of blades and separate the first gas flow path and the second gas flow path.

14. A gas turbine engine system comprising:

a first gas flow path;

a second gas flow path located radially outboard of the first gas flow path;

a third gas flow path located radially outboard of the second gas flow path;

a multi-stage fan having a first rotatable set of blades and a second counter-rotatable set of blades, the first rotatable set of blades defining an inner fan and a tip fan, and the second counter-rotatable set of blades downstream of the first rotatable set of blades; and an epicyclic differential gear assembly operative to receive a torque input and differentially apply the torque input to the first rotatable set of blades and the second counter-rotatable set of blades, wherein the gear assembly includes a first epicyclic gear and a second epicyclic gear which are axially spaced from one another and driven by a single sun gear;

wherein the tip fan is arranged in the third gas flow path, and the second counter-rotatable set of blades are arranged in the first gas flow path and the second gas flow path;

wherein the first gas flow path, the second as flow path, and the third gas flow path are partitioned from one another at a location upstream of the second rotatable set of blades.

15. The system of claim 14, further comprising a set of rotatable blades of a low pressure compressor located intermediate the first rotatable set of blades and the second counter-rotatable set of blades.

16. The system of claim 14, further comprising:

a first set of rotatable blades of a low pressure compressor operative to counter-rotate with respect to the second counter-rotatable set of blades of the multi-stage fan; and a second set of rotatable blades of the low pressure compressor operative to counter-rotate with respect to the first rotatable set of blades of the multi-stage fan.

* * * * *